United States Patent
Knight

(10) Patent No.: US 8,960,804 B2
(45) Date of Patent: Feb. 24, 2015

(54) CHILD SUPPORT STRAP

(75) Inventor: Richard Knight, Warwick (GB)

(73) Assignee: Systematic Strategy Limited (GB)

( * ) Notice: Subject to any disclaimer, the term of this patent is extended or adjusted under 35 U.S.C. 154(b) by 592 days.

(21) Appl. No.: 13/058,070

(22) PCT Filed: Aug. 10, 2009

(86) PCT No.: PCT/GB2009/001964
§ 371 (c)(1),
(2), (4) Date: Mar. 8, 2011

(87) PCT Pub. No.: WO2010/015842
PCT Pub. Date: Feb. 11, 2010

(65) Prior Publication Data
US 2011/0140489 A1 Jun. 16, 2011

(30) Foreign Application Priority Data
Aug. 8, 2008 (GB) .................................. 0814576.5

(51) Int. Cl.
*B60N 2/26* (2006.01)
*B60N 2/28* (2006.01)
*B60R 22/10* (2006.01)

(52) U.S. Cl.
CPC ............ *B60N 2/2803* (2013.01); *B60N 2/2812* (2013.01); *B60R 22/105* (2013.01)
USPC ......... 297/466; 297/250.1; 297/464; 297/484

(58) Field of Classification Search
USPC .................... 297/464–466, 484, 485
See application file for complete search history.

(56) References Cited

U.S. PATENT DOCUMENTS

| | | | | |
|---|---|---|---|---|
| 1,616,349 A | * | 2/1927 | Cagle | 297/465 |
| 2,908,324 A | | 10/1959 | Muller et al. | |
| 3,529,864 A | * | 9/1970 | Rose et al. | 297/467 |
| 3,565,483 A | * | 2/1971 | Posey | 297/484 |
| 3,779,599 A | * | 12/1973 | Gottfried | 297/253 |
| 4,702,523 A | * | 10/1987 | Schrader et al. | 297/485 |
| 4,762,364 A | | 8/1988 | Young | |
| 5,056,869 A | * | 10/1991 | Morrison | 297/485 |
| 5,141,287 A | * | 8/1992 | Grene | 297/483 |
| 5,154,487 A | * | 10/1992 | Warburton | 297/465 |
| 5,154,496 A | | 10/1992 | Campbell et al. | |
| 5,308,116 A | * | 5/1994 | Zawisa et al. | 297/483 |
| 5,588,699 A | | 12/1996 | Rundle | |
| 5,649,744 A | * | 7/1997 | Apodaca | 297/485 |
| 5,797,654 A | * | 8/1998 | Stroud | 297/483 |
| 5,915,789 A | * | 6/1999 | Ponce De Leon, III | 297/484 |
| 5,931,503 A | | 8/1999 | Glendon | |
| 5,964,502 A | | 10/1999 | Stephens | |

(Continued)

FOREIGN PATENT DOCUMENTS

GB 2415939 A 1/2006
GB 417224 A 2/2006

(Continued)

*Primary Examiner* — Peter Brown
(74) *Attorney, Agent, or Firm* — Maginot, Moore & Beck LLP

(57) ABSTRACT

A child restraining system for a vehicle the system comprising: at least one web (60), suitable for attachment to a harness comprising a shoulder strap (14); wherein in use the one or more webs (60) covers an area substantially below the scapula and the same or a different web covers at least part of the side of the abdomen; thereby limiting the ability of a child to slide an arm or a shoulder out from under the strap (14).

14 Claims, 7 Drawing Sheets

(56) References Cited

U.S. PATENT DOCUMENTS

| | | | |
|---|---|---|---|
| 6,007,156 A * | 12/1999 | Chang | 297/465 |
| 6,053,580 A * | 4/2000 | White, Sr. | 297/467 |
| 6,846,020 B2 * | 1/2005 | Xu | 280/808 |
| 7,520,532 B2 * | 4/2009 | Bell et al. | 280/808 |
| 2010/0115685 A1 | 5/2010 | Hepler | |

FOREIGN PATENT DOCUMENTS

| | | |
|---|---|---|
| GB | 2417224 A | 2/2006 |
| JP | 2002-307988 | 10/2002 |
| JP | 2002 307988 A | 10/2002 |
| WO | WO93/01956 A1 | 2/1993 |
| WO | 2005000626 A1 | 2/2006 |

* cited by examiner

CHILD SUPPORT STRAP

PRIORITY

This application is a U.S. National Stage Application of International Patent Application PCT/GB2009/001964, titled Child Support Strap, filed 10 Aug. 2009, which claims priority to Great Britain Application 0814576.5, filed 8 Aug. 2008, each incorporated herein by reference.

TECHNICAL FIELD

The invention relates to improvements in child safety harness the type found in child safety seats. More specifically the invention relates to a web that prevents the child from removing their arms from a shoulder strap on the harness.

BACKGROUND TO THE INVENTION

It is known to provide young children, especially those under the age of 12 with a child seat or booster seat. It is also known for forward facing child support seats to incorporate an integrated three point harness (straps across both shoulders and crotch) or five point harness (straps across both shoulders, the pelvic area and crotch), which are designed to minimise the risk of injury in the event of a crash by spread the force across as large an area as possible. The three or five point harness also restrains the child's lower body preventing the child from sliding out of the seat and/or the harness. These seats are typically designed for children between the ages of 9 months and 4 years old and often contain adjustable harnesses. It is also known for these seats to have interchangeable covers, so that they may be removed and cleaned or replaced.

A problem with a child seat is that a child is able to easily manipulate their arms through the underside of the shoulder strap, thereby removing their shoulders from the shoulder strap. This essentially converts the harness into a lap harness which is potentially dangerous in the event of an accident, as the entire restraining force is concentrated onto the midriff of the child. It is therefore desirable to be able to prevent a child from removing the shoulder straps.

JP2002-307988 indirectly solves this problem by making the child wear a vest onto which the restraining harness is attached, and the vest and harness are then attached to a child seat. The vest prevents the child from removing their arms from the shoulder strap as the straps are sown onto the vest. Such an arrangement is uncomfortable for the child as it introduces an extra layer of clothing, it also requires the vest to be carried with the seat, it is also difficult to use in that the vest must be worn by the child and then attached to the seat. Finally such a solution is not compatible with the majority of existing child seats on the market.

It is therefore desirable to be able to solve the problem of children removing their arms from the shoulder strap of a car seat harness in a manner that is easy to use, comfortable for the child and applicable to the majority of known child car seats.

SUMMARY OF THE INVENTION

To overcome these and other problems in the prior art, there is provide a restraining means which can either be integrated into a child car seat or retrofitted onto the harness. Additionally, the reader will appreciate that further aspects and/or features of the invention are further set out in the other appended claims.

There is provided according to an aspect of the invention, a child restraining system for a vehicle the system comprising; at least one restraining web, suitable for attachment to a harness comprising a shoulder strap; wherein in use the one or more webs covers an area substantially below the armpit or scapula and the same or a different web covers at least part of the side of the abdomen; thereby limiting the ability of a child to slide an atm or a shoulder out from under the strap Preferably wherein the web is a single web that extends from the scapula to the lower abdomen Preferably wherein there are plurality of webs, the plurality of webs substantially covering the area below the scapula to the lower abdomen.

Preferably wherein the one or more restraining webs extend solely along the side of the body.

This is achieved by, for example, limiting the length of the gap between the shoulder strap and seat through which the child's arm is placed.

The web provides a restraining means so that the child may no longer slip their arms through the shoulder harness. Such an embodiment is suitable for the use in new car seats or may be incorporated onto existing car seat shells. In a further embodiment the invention is incorporated onto an interchangeable car seat cover where one part of the web is fixedly attached to the car seat cover. Thus allowing the invention to be used on existing car seats.

Preferably, at least part of the web is attached to a shoulder strap.

Preferably, the position of the web is adjustable along the length of the harness. For example, the strap may extend through a tube formed on one end of the web which attaches the web to the harness.

Preferably, wherein the harness comprises two shoulder straps and the web extends between each shoulder strap, wherein a first end of the web is attached to a first strap, and a second end is attached to a second shoulder strap.

Preferably, the web extends between a shoulder strap to a fixing on the seat.

Preferably, wherein the harness comprises two shoulder straps, one for each shoulder, each shoulder strap comprising a web extending between a shoulder strap comprising a web extending between a shoulder strap and a fixing in the seat.

Preferably, wherein the fixing to the seat is adjustable.

Preferably, where the harness is a 5 point harness,

Preferably, where the system is removable attached to a passenger seat of the vehicle.

Preferably, wherein the web is releasably attached to a strap and/or seat by one or more of hook and loop fasteners (e.g. Velcro™), zip fasteners, buttons, snap fasteners.

Preferably, wherein the web comprises a breathable material.

There is also provided a web adapted to be attached to a shoulder strap of a harness of a child restraining seat, the web adapted to limit the ability of a child to slide an arm or a shoulder out from under the strap when in use.

In this embodiment of the invention the web may be retrofitted onto any pre-existing harness.

Preferably, the web is adapted to be attached at a first end to a first shoulder strap and a second opposite end to a second shoulder strap Preferably, the web is adapted to be attached to a shoulder strap and to a portion of a seat.

Preferably, the web is adapted to be movable along a length of the strap and/or relative to the seat fixing.

A cover for a car seat comprising a web as defined above.

BRIEF DESCRIPTION OF THE DRAWINGS

Further aspects, features and advantages of the invention will be apparent from the following description of preferred embodiments, presented by way of example only, and by reference to accompanying drawings wherein.

DETAILED DESCRIPTION OF AN EMBODIMENT OF THE INVENTION

Figure 1:
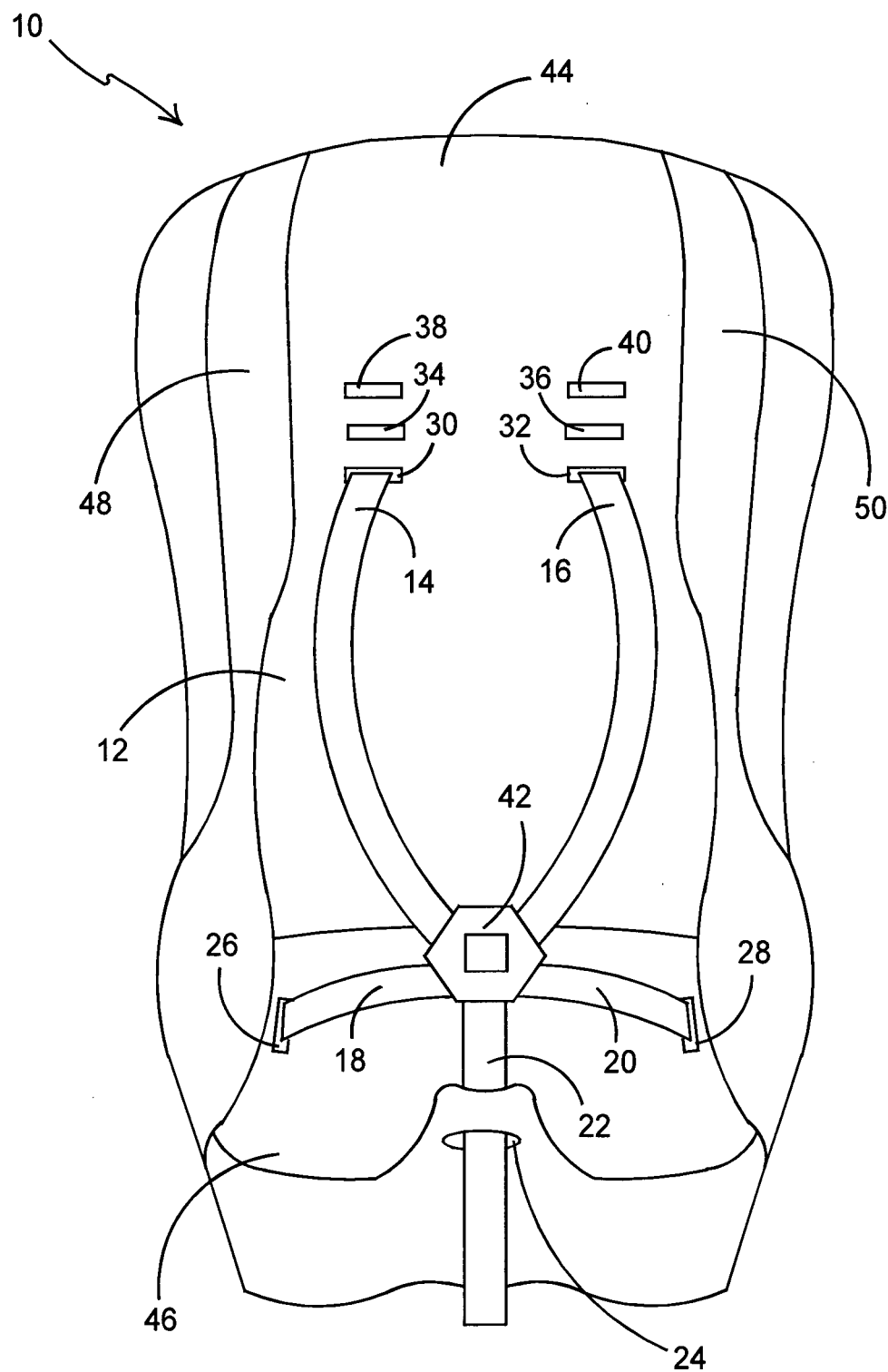
FIG. 1 shows a typical child seat with a five point harness.

FIG. 1 shows a typical child seat with a five point harness known in the art. There is shown the car seat shell 10, harness 12, the harness comprising two shoulder straps 14, 16, two midriff straps 18, 20 and a crotch strap 22, which may pass through a guiding loop 24. The midriff straps 18, 20 are attached to the car seat shell 10 through guides 26, 28 and is attached to the car seat shell 10 through known means (not shown). The shoulder straps 14, 16 pass through guides 30, 32 and are attached to the car seat shell 10 by known means (not shown). Typically, there are guides 34, 36 and 38, 40 at various heights allowing the height of the shoulder straps 14, 16 to be adjusted. The shoulder straps 14, 16 midriff straps 18, 20 and crotch strap 22 converge at a buckle 42. There is also shown the backrest 44, seat portion 46 and side walls 48, 50. The car seat shell 10 may also have a removable cover, typically made of synthetic material, allowing for easy replacement of the exterior whilst keeping the car seat shell 10.

A similar design is also known, which incorporates a three point harness instead of the five point harness 12.

The present invention does not concern improvements of these known features and these numbers will be adhered to the remainder of the specification.

Figure 2:
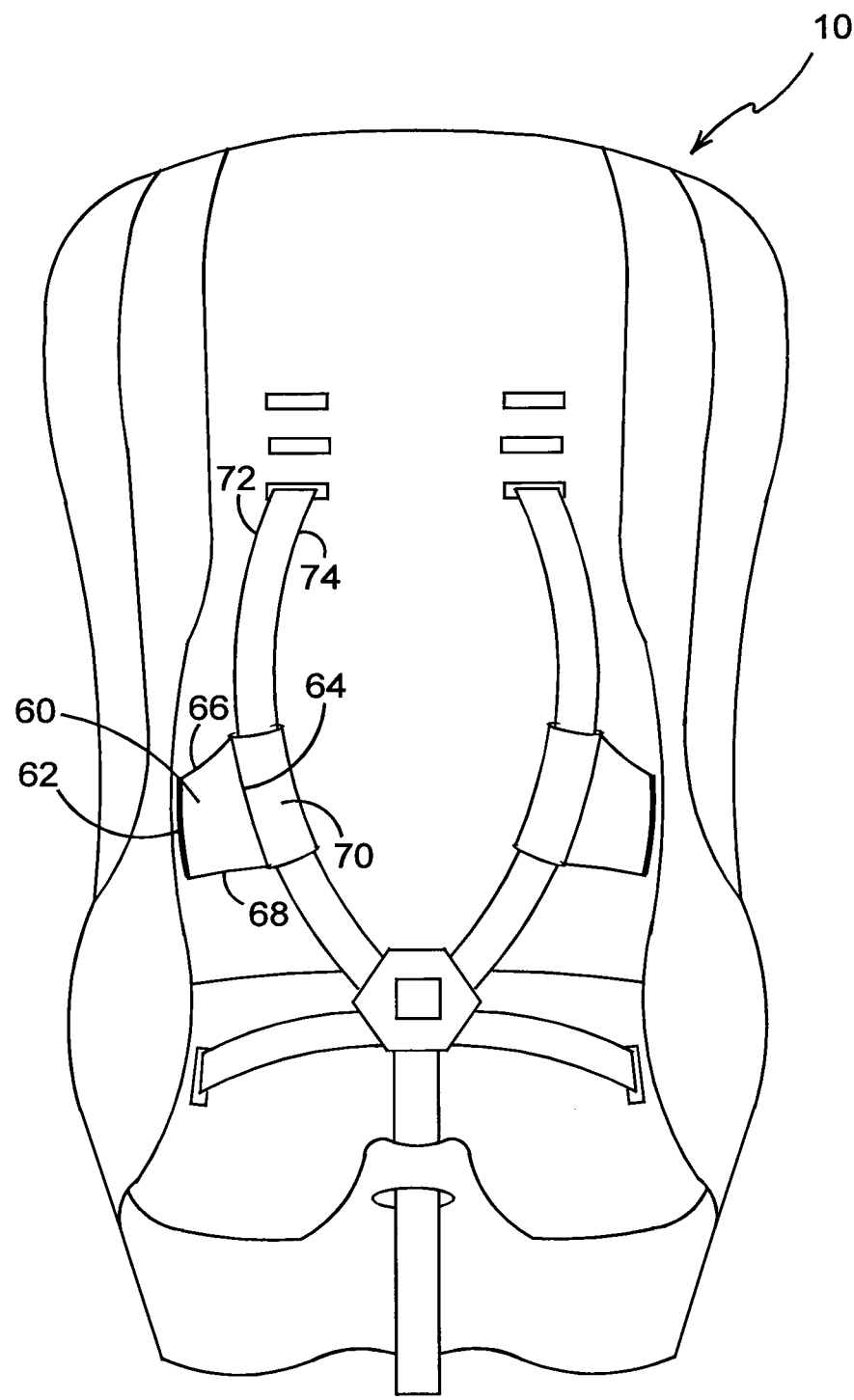
FIG. 2 shows a front elevation of a child restraining strap according to the first embodiment of the invention.

FIG. 2 shows a child restraining strap according to the first embodiment of the invention. There is shown the car seat shell 10 as described with reference to FIG. 1.

There is also shown the first embodiment of the invention comprising a web 60, backrest attachment 62, shoulder strap attachment 64, top edge of the web 66, bottom edge of the web 68, shoulder attachment tube 70, side edge of the shoulder strap 72 and the central edge of the shoulder strap 74.

The web 60 is taken to be a piece of material, in the form of a wedge, panel, flared piece of material to fill a space between two points. The web may be any suitable material such as cloth, a sheet of cloth or plastic, woven materials, elasticised cloth etc. Preferably such materials comply with the relevant regulations regarding car seats. Examples of a web according to the invention are shown in greater detail with reference to FIG. 6.

In the preferred embodiment the web 60 is constructed of an elasticised breathable material. In further embodiments the material is the same material used in the car seat cover, or in yet another embodiment is made of the same material used in the harness. The breathable material prevents discomfort for the child, especially in hot climates where the additional layer of material is undesirable. The web 60 may also be padded at the top edge 66 and bottom edge 68 for comfort. The web 60 is attached to the backrest 44 via the backrest attachment 62. In a further embodiment the web 60 is attached the nearest sidewall 48, 50 of the shoulder strap 14, 16 to which the web 60 is attached. The backrest attachment 62 is preferably fixedly attached to the backrest 44. The attachment means may be any known suitable means such as being sewn, riveted etc.

The web 60 may supplement the harness 12, by equally distributing the force of an impact across the side of the child's body as well as onto the shoulder straps 14, 16 midriff straps 18, 20 and crotch strap 22. In such an embodiment the material of the web 60 and backrest attachment means 62 is dictated by the relevant safety standards to which the car seat and harness must comply.

In a further embodiment the web 60 is only intended to restrict the arms of the child, and therefore need not be fixedly attached to the backrest 44 and may have removable attachment means such as a zip fastener, buttons, hook and loop, snap fasteners etc.

The web 60 is attached to the shoulder strap 14 at the shoulder strap attachment 64. In the preferred embodiment the shoulder strap attachment 64 defines a tube 70 which encloses a part of the shoulder strap 14 and is moveable along the length of the shoulder straps 14, 16. The web 60, in an embodiment, passes via the underside of the shoulder strap 14, over the central edge of the shoulder strap 72, over the topside of the shoulder strap to the side edge of the shoulder strap 72 and to the shoulder strap attachment means 64, which are positioned on the side edge of the shoulder strap 72 thereby defining the shoulder attachment tube 70. In other embodiments the position of the shoulder strap attachment means 64 and the path of the web 60 may vary according to any desired design variation, for example the shoulder strap attachment means 64 may be located on the central edge of the shoulder strap 74. Those skilled in the art will understand that the position of the shoulder strap means 64 may be varied without affecting the overall function of the invention. The shoulder strap attachment means 64 are preferably detachable for safety reasons, allowing the child to be quickly removed form the seat if required. The attachment means may be any known suitable means such as a zip, buttons, hook and loop etc.

In an embodiment of the invention the backrest attachment 62 is physically attached to the car seat shell 10. For example, if the backrest attachment 62 was a rivet, the rivet would be anchored into the car seat shell 10. In such an embodiment the attachment means are preferably inserted into the car seat shell 10 during the manufacturing stage of the seat so as not to compromise the integrity.

In another embodiment the backrest attachment 62 is incorporated into fabric cover of the car seat shell 10 via the detachable covers. For example in the case of a hook and loop attachment means the car seat cover would have an area of hooks and the web 60 would contain an area of loops or vice versa. This allows the web 60 to be fitted onto an existing car seat shell 10 without need for working the car seat shell 10 and potentially comprising the integrity.

In a further embodiment the backrest attachment 62 may also be an adjustable means allowing the web 60 to be adjusted to fit children of various heights and builds. The adjustable means may be any known means in the art, for example the backrest attachment means may be vertical row of snap fasteners allowing a user to choose at which height they wish to attach the web 60.

In yet another embodiment the shoulder attachment means 64 are fixedly attached to the shoulder straps 14, 16 and the adjustability comes from the backrest attachment 62 which are adjustable as described above. In this embodiment as the backrest attachment 62 is not fixed the child may still be removed from the seat quickly in the case of an emergency.

There are many regulations regarding the construction of child seats. In particular, UN ECE R44 "Uniform provisions concerning the approval of restraining devices for child occupants of power-driven vehicles" states that a child restraint on a seat requires a single operation on a single buckle. Therefore, it is preferable that the invention complies with this regulation and does not introduce further restraints. In particular it is preferred that the web does not cover the sternum or part of the front of the chest or abdomen of the child.

Figure 3:
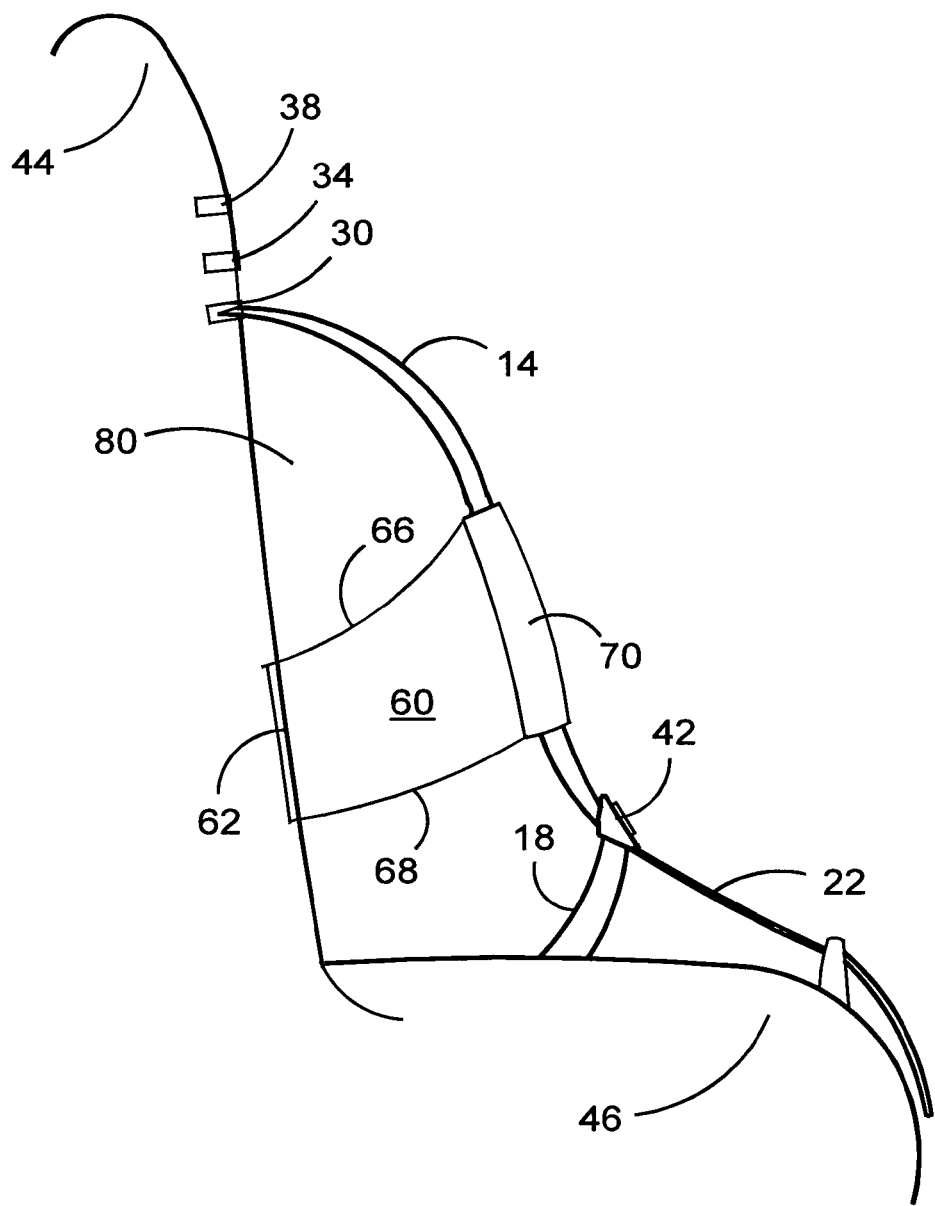
FIG. 3 shows a side elevation of a child restraining strap according to the first embodiment of the invention.

FIG. 3 shows a side elevation of a child restraining strap according to the first embodiment of the invention. The Figure shows a side elevation from side wall 48. There is shown the car seat shell 10 and web 60 as described with reference to FIGS. 1 and 2. There is also shown the volume space 80 as defined by the top edge of the web 66, the backrest 44 and shoulder strap 14.

In use the child will insert their arm through the volume space 80 and will use the seat in the normal manner. In a typical child car seat the straps are tightened but the child may be able to remove an arm from a shoulder strap 14, 16 by inserting a hand under the side edge of the shoulder strap 72 and pulling their arm through. In the present invention the volume space 80 is greatly reduced preventing the child being able to insert their arm under the shoulder strap 14.

The size of the volume space 80 is defined by the adjustability of the top edge of the web 66 which is controlled by the adjustability of the shoulder attachment tube 70 and/or backrest attachment 62. When in use, it is desirable for the top edge of the web 66 to be as close to the shoulder strap 14 as possible to minimise the possibility of a child inserting their hand and arm under the shoulder strap 14. However, the volume space 80 should be large enough for a child to insert their aims without discomfort. The adjustability of the shoulder attachment tube 70 and/or backrest attachment 62 provides the means for adjusting the volume space 80.

Figure 4:
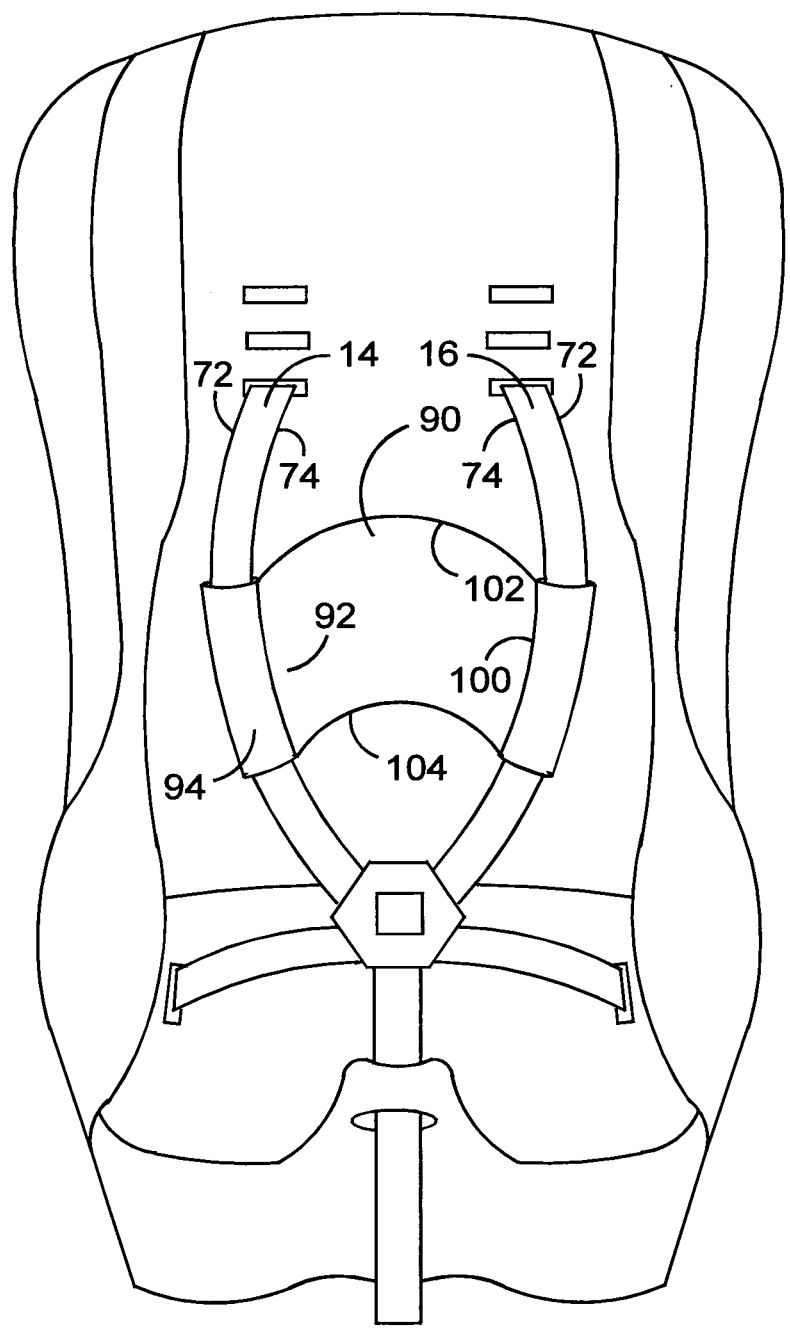
FIG. 4 shows a front elevation of a child restraining strap according to a second embodiment of the invention.

FIG. 4 shows a front elevation of a child restraining strap according to a second embodiment of the invention, There is shown a car seat shell 10 as described with reference to FIGS. 1 and 2.

There is also shown a web 90, which comprises a back panel 92, shoulder attachment tubes 94, 96, shoulder attachment means 98 and 100, the back panel having a top edge 102 and a bottom edge 104. In a further embodiment (not shown in FIG. 4) the back panel 92 is a chest panel covering the front torso of the user. Those skilled in the art will appreciate that the following features described with reference to a back panel 92 are equally applicable to a chest panel.

In this embodiment of the invention the web 90 is solely attached to the harness 12 and is not attached to the shell 10 or the shell cover. The web 90 is attached to the shoulder straps 14, 16 by the shoulder attachment means 98, 100. As in the embodiment described above with reference to FIG. 2 the web defines a tube 94, 96 which is sealed at the attachment means 98, 100. To allow for adjustability of the strap 90 these tubes 94, 96 are preferably moveable along the length of the shoulder straps 14, 16. In a further embodiment the shoulder strap tubes 94, 96 are fixed to the shoulder straps 14, 16 by the means 98, 100 are adjustable. For example the tubes 94, 96 may contain a row of snap fasteners which spans a length greater than the height of the web 90. The web 90 is attached at the desired position along the tube to the snap fasteners allowing the position of the web 90 with respect to the tube to be varied. In further embodiments different attachment means, such as hook and loop fasteners are used to achieve the desired result. Preferably the web 90 is a sheet of material to go around the back (or in another embodiment, across the front) of the child.

As with the first embodiment the attachment means may be any suitable means such as zip, hook and look, buttons, snap fastener etc.

In the chest panel embodiment the panel need not comprise a single piece of material. For example the panel may comprise two or more pieces of material which are attached to shoulder straps 14, 16 in the manner described above and further attached to each other in the middle of the torso region. The attachment means would be any suitable means for repeated use e.g. zip, hook and look, buttons, snap fastener etc. The chest panel would prevent the child from removing their arms from the shoulder strap s 14, 16 and would beneficially supplement the harness 12 in the event of an accident, though it must be noted this is a secondary benefit. The attachment means are preferably substantially at the centre of the chest panel, allowing for easy removal of a child in the vent of an emergency.

Figure 5:
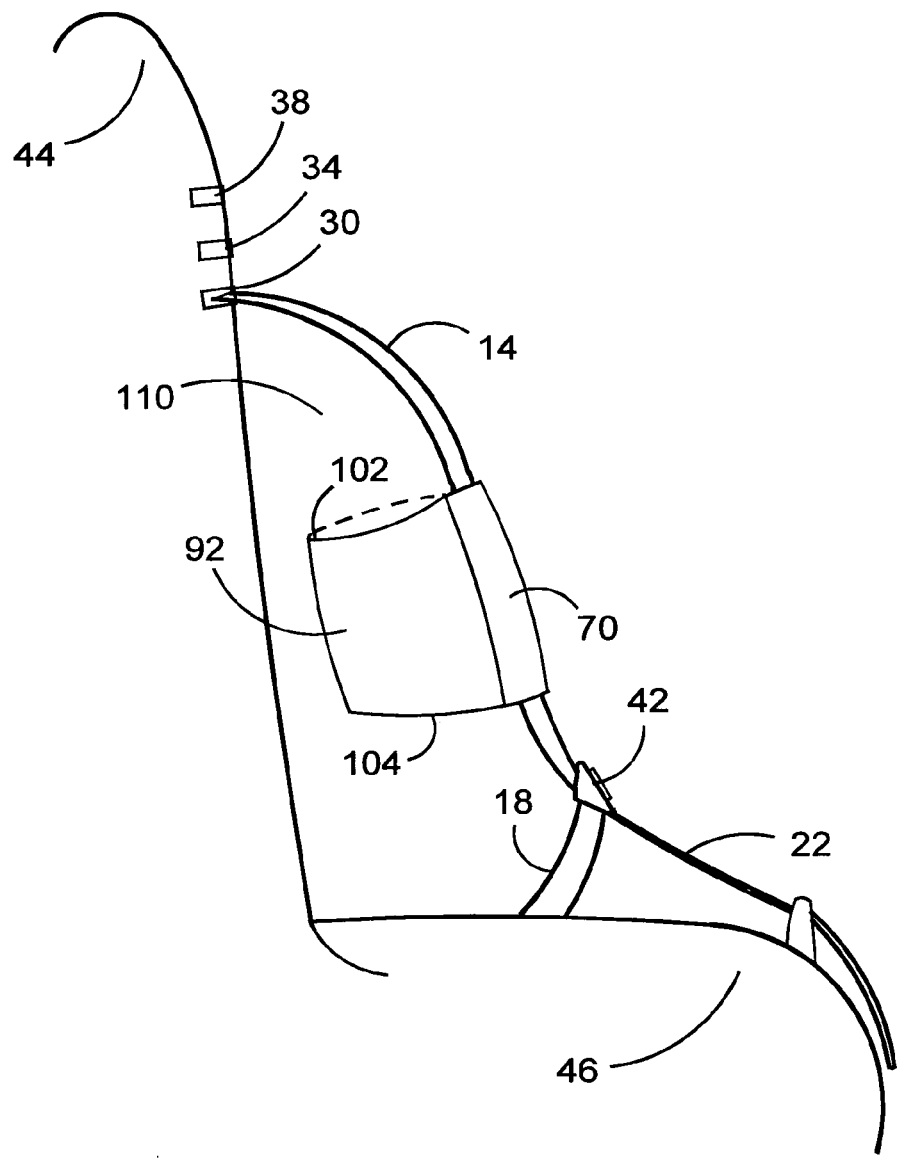
FIG. 5 shows a side elevation of a child restraining strap according to the second embodiment of the invention.

FIG. 5 shows a side elevation of a child restraining strap according to the second embodiment of the invention. There is shown the web as described with reference to FIG. 4 and further shows a volume space 110.

As in the first embodiment the web 90 and back panel 92 define a volume space 110 between the top edge of the back panel 102 and shoulder strap 14. As with the first embodiment of the invention the volume space allows the child to insert their arms through but prevents them from removing their arms from the shoulder strap by way of inserting a hand under the strap. Again the size of the volume space 110 is adjustable by way of adjustable shoulder attachment 98, 100 and/or shoulder attachment tubes 94, 96.

The advantage of the embodiment described with reference to FIGS. 4 and 5 is that it is allows for a retrofit of the invention to existing child car seats. It simply requires the strap 90 to be fastened on the shoulder straps 14, 16 by the attachment means 98, 100. Such an embodiment advantageously does not require the working of an existing car seat, which may compromise the structural integrity of the car seat shell 10. Furthermore, as the invention only comprises a web of material and fastening means it is relatively inexpensive and easily fitted onto existing seats providing a cheap, easy-to-fit enhancement to known existing car seats.

The above embodiments are non-limiting examples of the invention and those skilled in the art will appreciate that the invention may be subject to many minor amendments in the shape, material, fastening means and position of the fastening means without deviating from the inventive concept. Furthermore, whilst the above embodiments have been described with respect to a three or five point harness on a known child seat, those skilled in the art will appreciate that such an invention may be applicable to a booster seat or any safety system where children are strapped in and may attempt to remove their arms e.g. push chairs.

FIG. 6 show examples of the web according to an aspect of the invention.

Figure 6A:
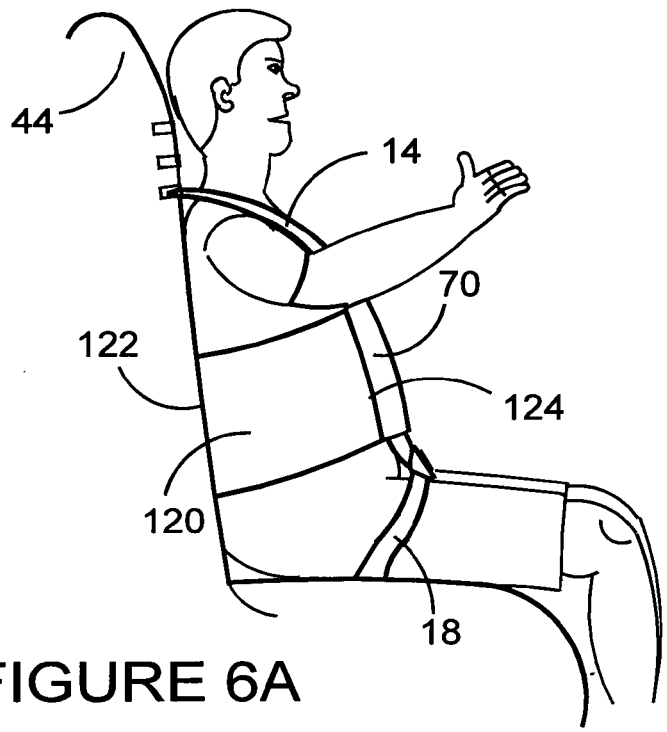
FIG. 6 shows an example of the restraining web according to an aspect of the invention.

In FIG. 6a, there is shown the web 120 attached to the backrest 44 of the seat. The web comprises a seat end 122 and a harness end 124 and a shoulder attachment tube 70.

The purpose of the web is to prevent the child from being able to insert their hand and arms beneath the shoulder straps 14, 16 in order to remove their aims from the straps. Therefore, the web must be designed to provided a volume space 80 that is sufficiently large for a child to place their arms without difficulty yet prevent the child from placing their hands and arms under the strap. It is found that the typical size of the volume space 80 is between 10 to 25 ems in height (i.e. sufficiently large for a child to insert their shoulder and arm into the space). Preferably the top edge of the web should extend to near the armpit of the child, just below the scapula. It is found that in order to avoid discomfort for the child, it is preferable that the top edge of the web does not rub the armpit of the child. The size of the volume space required, naturally changes according to the size of the child.

It has been found that a single thin strap provides insufficient restraint and allows a child to remove the straps from their shoulders, causing the straps to slid down their arms. This can lead to a potentially dangerous situation where in the event of an accident the restraints impart force across the upper aim and not the collar bone, potentially leading to dislocation of the arm. The applicant has advantageously found that it is much more difficult for a child to remove their aims when the web has an extended or flared shape. In such an embodiment the seat end 122 and harness end 124 of the web 120 are of different heights. For example the seat end 122 may be smaller than the harness end 124 thereby creating a flared web.

Preferably the seat end 122 and harness end 124 of the web 120 extend most of the length of the child's torso preferably to the lower abdomen, between 15 to 60 cm in length. Therefore the web 120 defines a panel of material that is preferably substantially the length of the child's torso. In other embodiments, the web may be extended to cover the hips and legs of the child as well.

Figure 6B:
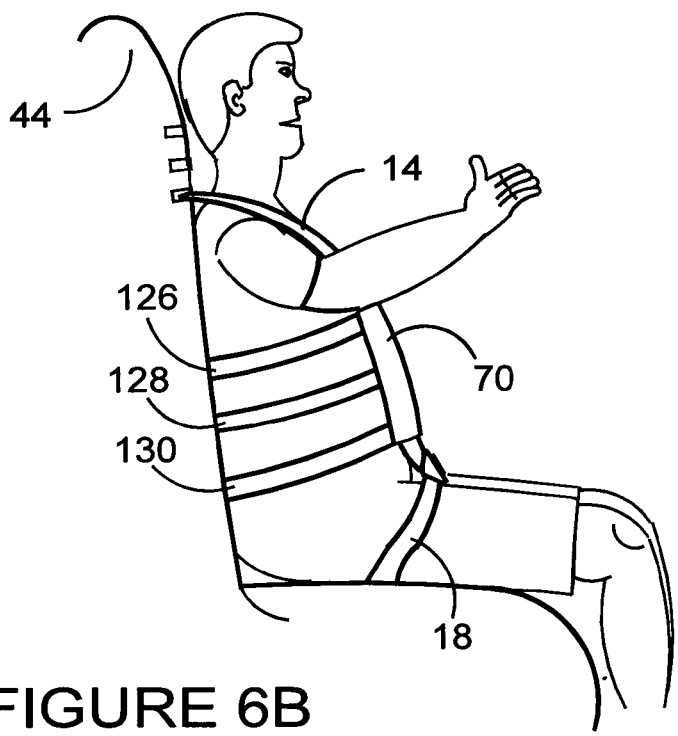

In FIG. 6b there is shown a further embodiment of the web, wherein the restraining web comprises a plurality straps 126, 128, 130. Importantly the webs 126, 128 and 130 in combination have the same effect as the single web as shown in FIG. 6a.

The top strap is approximately at the level of the child's scapula or lower armpit and the bottom strap 130 approximately at the level of a child's hip at the lower abdomen.

In this configuration, the plurality of straps still prevents the child from inserting their hands and arms under the shoulder straps. Whilst there is only shown one middle strap 128 in FIG. 6b, the skilled man will realise that any number of middle straps 128 may be used according to design considerations.

The web therefore is taken to extend to cover a substantial part of the length of the child's torso, preferably extending from the armpits to the hips of a child in either single web of material or as a plurality of pieces of material which cover substantially the same area.

For the comfort of the child, the web is preferably made from an elasticated, breathable material.

Figure 7:
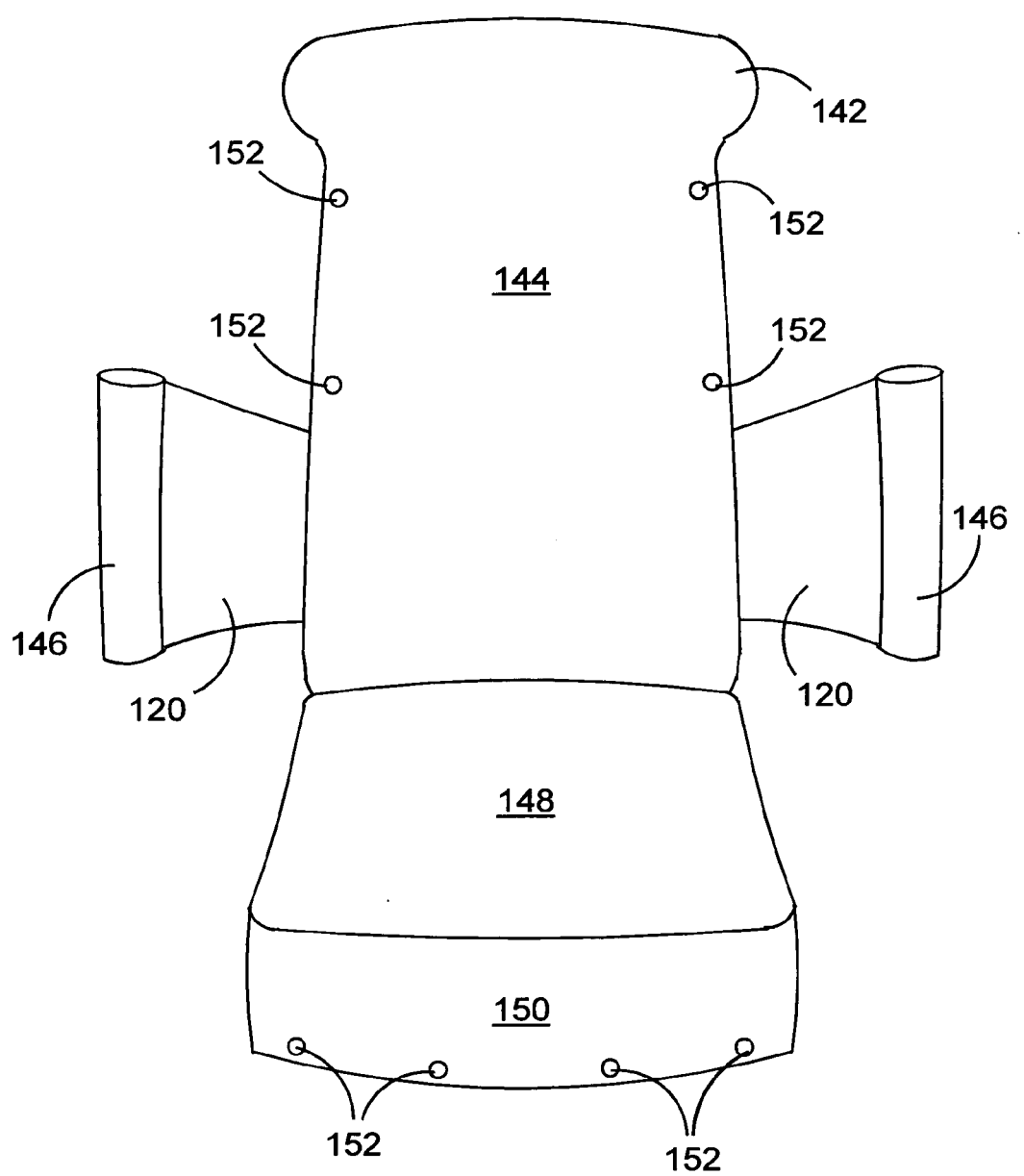
FIG. 7 shows an example of the retro-fit embodiment of the invention, where the restraining web is incorporated onto a cover that may be attached to an existing car seat.

FIG. 7 is a further embodiment of the invention. In this embodiment, the web is part of a retrofit cover that is intended to be used on an existing system such as one shown in FIG. 1.

There is shown the retrofit cover 140, comprising: a headrest portion 142; a backrest portion 144; a shoulder strap inlet 146; a seat portion 148; a lower seat portion 150; fastening means 152; the restraining webs 120 and the shoulder strap attachment 70.

In use the retrofit cover 140 is placed on the existing seat cover of a car seat shell. The cover is fastened to the existing cover via the fastening means 152. In the preferred embodiment the fastening means 152 are hook and loop means, but any other suitable means may be used, such as an elasticated seam. The retrofit cover 140 is intended to placed on the existing seat cover and is fastened at the various fastening means 152.

As can be seen, the retrofit cover 140 allows for the restraining web 120 to be easily included on an existing car seat.

Those skilled in the art will realise that the embodiment shown in FIG. 7 is simply an illustrative example of the retrofit cover 140, and that changes in the shape and size of the cover may be easily affected without departing from the inventive concept of the invention. For example the headrest portion 142, shoulder strap inlets 146, seat 148 and lower seat portion 150 may be omitted entirely for design considerations without departing from the inventive concept of the restraining web 120. In a further embodiment the seat portion 148 and lower seat portion 150 are omitted but the headrest portion 142 retained.

Preferably, the retrofit cover 140 is made of a washable material, preferably one that complies to the relevant safety standards and regulations, allowing the cover to be removed and cleaned.

Whilst the above embodiment has been described with particular reference to five point harnesses, those skilled in the art will appreciate that whilst the web 90 is particularly suited to five point harnesses it may also be applied to shoulder, pelvis and lap type three point harnesses, where the web 90 would typically extend between the shoulder strap and lap strap or from the shoulder strap to the back or base of the seat.

The invention claimed is:

1. A child restraining system for a vehicle the system comprising:
   a child seat including;
      a backrest;
      a seat; and
      a restraining harness having a midriff strap arranged to traverse the waist of the child and a first shoulder strap having a length extending from the midriff strap over a shoulder of the child to a connection to said seat;
   at least one web, having a shoulder strap attachment at a first end configured to be adjustably engaged to said first shoulder strap and a second distal end connected to a portion of the child seat, said web having a top edge extending between said first end and said second end;
   wherein the at least one web is sized and shaped from the first end to the second end to cover an area between the shoulder strap and the child seat and between the armpit or scapula and at least part of the side of the abdomen of the child restrained within the child seat sufficient to limit the ability of a child to slide an arm or a shoulder out from between the shoulder strap and said web,
   wherein said web is sized and configured to define a space between said top edge and said connection to said seat of said first shoulder strap, said space extending along a first portion of said length of said first shoulder strap of 10-25 cm, and
   wherein said web is further sized and configured to extend along the majority of said length of said first shoulder strap from said top edge toward said midriff strap.

2. The system according to claim 1, wherein said shoulder strap attachment is configured to adjustably engage said first shoulder strap along the length of said shoulder strap and is sized to engage a portion of the length of said first shoulder strap sufficient to maintain said area at a position sufficient to limit the ability of a child to slide an arm or a shoulder out from between the shoulder strap and said web.

3. The system according to claim 1, wherein the harness includes two shoulder straps, one for each shoulder, each shoulder strap including a corresponding one of said at least one web extending between the shoulder strap and a fixing in the seat.

4. The system according to claim 3 wherein the fixing to the seat is adjustable.

5. The system according to claim 1 where the harness is a 5 point harness.

6. The system according to claim 1 wherein the web is flared between the first end and the second end.

7. The system of claim 1 wherein the web is releasably attached to one of the shoulder strap and the seat by one or more of hook and loop fasteners, zip fasteners, buttons, snap fasteners.

8. The system of claim 1 wherein the web comprises a breathable material.

9. The system according to claim 1 wherein said second end of the web is connected to one of the backrest and the seat portion of the child seat.

10. The system according to claim 1 wherein:
the restraining harness includes a second shoulder strap; and
at least one second web having a first end extending from said second shoulder strap of the harness and a second distal end connected to a portion of the child seat.

11. The system according to claim 10 wherein the at least one web and the at least one second web do not extend between the first and second shoulder straps of the harness.

12. The system according to claim 1 wherein said web includes a plurality of web elements, each having a first end extending from the first shoulder strap of the harness and a second distal end connected to a portion of the child seat.

13. A web for use with a restraining harness having a midriff strap arranged to traverse the waist of the child and a first shoulder strap having a length extending from the midriff strap over a shoulder of the child to a connection to said seat, said web comprising:
a shoulder strap attachment at a first end configured to be adjustably engaged to a shoulder strap of a harness of a child restraining seat and a second distal end configured for connection to a portion of the child seat; and
a top edge extending between said first end and said second end,
wherein the web is sized and shaped from the first end to the second end to cover an area between the shoulder strap and the child seat and to cover an area of a child's body substantially below the armpit or scapula and at least part of the side of the abdomen of the child restrained within the restraining seat to thereby limit the ability of the child to slide an arm or a shoulder out from between the shoulder strap and said web,
wherein said web is sized and configured to define a space between said top edge and the connection to the seat of the first shoulder strap, said space extending along a first portion of the length of the first shoulder strap of 10-25 cm, and
wherein said web is further sized and configured to extend along the majority of the length of the first shoulder strap from said top edge toward the midriff strap.

14. The web according to claim 13 wherein the web is configured to be movable along a length of the strap and/or relative to the seat fixing.

* * * * *